United States Patent [19]
Gay et al.

[11] Patent Number: 5,865,329
[45] Date of Patent: Feb. 2, 1999

[54] ELECTRIC/PNEUMATIC HERMAPHRODITIC CONNECTOR

[75] Inventors: Gary Sumner Gay, Unadilla; David Otis Gallusser, Oneonta; Gregory John Oleksik, Otega, all of N.Y.

[73] Assignee: Amphenol Corporation, Wallingford, Conn.

[21] Appl. No.: 814,714

[22] Filed: Mar. 11, 1997

[51] Int. Cl.⁶ .............................. B61G 5/08; B61G 5/10
[52] U.S. Cl. .............................. 213/1.3; 213/76; 439/195
[58] Field of Search ....................... 213/1.3, 76; 439/190, 439/195; 285/68, 69, 87

[56] References Cited

U.S. PATENT DOCUMENTS

| | | | |
|---|---|---|---|
| 373,759 | 11/1887 | Taylor | 439/195 |
| 523,847 | 7/1894 | Baker | 439/195 |
| 1,224,952 | 5/1917 | Naginey et al. | 246/166.1 |
| 3,523,266 | 8/1970 | Wetzig et al. | 439/135 |
| 3,879,066 | 4/1975 | Kozinski | 285/69 |
| 5,480,042 | 1/1996 | Engle | 213/1.3 |
| 5,586,668 | 12/1996 | Miller | 213/1.3 |
| 5,658,159 | 8/1997 | Gardner et al. | 213/76 |

*Primary Examiner*—S. Joseph Morano
*Attorney, Agent, or Firm*—Bacon & Thomas, PLLC

[57] ABSTRACT

A standard hermaphroditic pneumatic glad-hand coupler includes a data bus connector containing a pair of contacts, each contact having an axis tangential to the arc along which the connector is carried during rotation of the coupler during establishment of a pneumatic connection. The pair of contacts can be in the form of a pair of hermaphroditic contacts, or one female and one male contact. In the female/male version, the female contact is surrounded on all sides except the mating and termination ends by an elastomeric dielectric projection and the male contact is situated in a pocket bordered by elastomeric dielectric material and arranged to receive the elastomeric dielectric projection when the male and female contacts are mated together upon coupling the glad-hand coupler with an identical glad-hand coupler so as to surround both contacts and also isolate the contacts from each other. In the hermaphroditic contact version, each of the contacts is partially surrounded by elastomeric dielectric projections which form pockets arranged to receive corresponding dielectric projections of a mating coupler and thereby completely surround and isolate each of the contacts from each other.

15 Claims, 9 Drawing Sheets

ELECTRIC/PNEUMATIC HERMAPHRODITIC CONNECTOR

BACKGROUND OF THE INVENTION

1. Field of the Invention

This invention relates to a glad-hand pneumatic coupler for rail cars, and in particular to a glad-hand pneumatic coupler which also serves as a data bus coupler.

2. Discussion of Related Art

"Glad-hand" couplers are widely used in the railcar industry for the purpose of establishing connection of pneumatic brake lines extending between railcars. Because of the interchangeability of railcars, and the consequent need for standardization, the essential form of such couplers has remained the same virtually since the invention of the railcar air brake more than a century ago.

A basic feature of railcar glad-hand couplers is hermaphrodicity. Because railcars do not have a preferred front or rear, it is essential that a coupler on one railcar be able to mate with couplers on either end of another railcar.

The standard pneumatic glad-hand coupler includes a rearwardly-extending ferrule on which a pneumatic fluid-carrying hose is fitted and clamped, a disc-shaped elastomeric sealing member having a central opening whose axis is perpendicular to that of the entry ferrule, a flange including a ramp surface, and an extension which serves as a camming surface for causing the sealing member to be compressed against a corresponding sealing member of a mating connector to effect a sealed connection between openings upon relative rotation of the mating couplers.

It has recently been proposed to control pneumatic brake actuation in individual railcars electronically in order to provide better braking control and improve safety. The braking control signals are carried by high voltage insulated data bus cables which, like the conventional pneumatic hoses, extend between the railcars and need to be manually connected following coupling of the railcars. However, because of the requirement that coupling compatibility be maintained throughout the railway system, newer cars with electrical brake actuation must still be able to establish connections via the standard couplings to older cars lacking electronically controllable brakes.

Coupling of the electrical data bus cables can of course be achieved without the need for modifying the standard glad-hand coupler by providing completely separate electrical connections for the data bus. This has the disadvantage of increasing the amount of labor required during coupling of the railcars, and also the chance of an incomplete or improper connection.

On the other hand, while it has been previously proposed to avoid this disadvantage by combining an electrical connector with a glad-hand coupler so that the electrical connection is completed upon completion of glad-hand coupling, the previously proposed electrical connector/pneumatic coupler combinations are unsuitable for use in connection with data buses of the type which carry critical control signals between the railcars cars.

Examples of previous proposals for combining conventional glad-hand pneumatic couplers with electrical connectors dating back to the nineteenth and earlier twentieth century are found in U.S. Pat. Nos. 373,759, 523,847, and 1,224,954. The connectors shown in these patents were designed to carry simple low voltage accessory wires, for bells, phone lines, and the like, and made no provision for dielectric isolation of wires, shock protection, or wire routing, all of which are essential to carry the 240V driving potential of the proposed electronic brake actuators, and which are incompatible with the previous designs.

The present invention addresses this need for a practical glad-hand coupler capable of providing a data bus connection while maintaining dielectric isolation of data lines, shock protection, and wire routing, and that still offers industry-wide compatibility of glad-hand couplers, including the ability to couple with conventional solely-pneumatic couplers.

SUMMARY OF THE INVENTION

It is accordingly an objective of the invention to provide a glad-hand coupler which adds a data bus connector while maintaining compatibility with standard pneumatic glad-hand couplers such as are used throughout the railcar industry.

It is another objective of the invention to provide a glad-hand coupler which adds a data bus connector while maintaining hermaphrodicity.

It is a further objective of the invention to provide a glad-hand coupler having a data bus connector which provides dielectric isolation between contacts so that there is no electrical breakdown between the wires or the housing.

It is also an objective of the invention to provide a glad-hand coupler having a data bus connector which insulates the contact to protect against shock hazards arising from high voltage brake control signals carried by the connector.

Finally, it is also an objective of the invention to provide a glad-hand coupler having a data bus connector which prevents misrouting of the wires in the data bus to ensure a proper data bus function.

These objectives are achieved by providing a hermaphroditic pneumatic glad-hand coupler in which the data bus connector function is carried out by an extension containing a pair of contacts, each contact having an axis tangential to the arc along which the contacts are carried during rotation for the purpose of establishing a pneumatic connection. The contacts may be in the form of a female fork contact and a male blade contact, the female contact being surrounded on all sides except the mating and termination sides by an elastomeric dielectric projection and the male contact being situated in a pocket bordered by elastomeric dielectric material and arranged to receive the elastomeric dielectric projection when male and female contacts are mated together upon coupling the glad-hand coupler with an identical glad-hand coupler. An alternative contact arrangement could be obtained with a hermaphroditic contact providing a slide by and overlapping configuration to make the electrical data bus connection.

DETAILED DESCRIPTION OF THE PREFERRED EMBODIMENTS

As shown in FIGS. 1 and 2A–2C, the coupler of the preferred embodiment of the invention includes a ferrule 1 over which a pneumatic line (not shown) is fitted. Ferrule 1 includes, as is conventional, frustoconical sections 2 for helping to retain the line on the ferrule, and over which a clamp or other fastening member (not shown) may be placed to secure the connection. A main section 3 of the coupler attached at a collar 2' to the ferrule includes a generally disc-shaped elastomeric sealing member 4 having an axis perpendicular to the axis of the ferrule and a curved connecting passage or tube 5 whose interior is in communication with the interior 6 of the ferrule, the passage communicating with an opening 7 of elastomeric sealing member 4, opening 7 having an axis that extends transversely to the axis of the ferrule.

An L-shaped extension 8 of the main section of the coupler includes a first arm 9 and a locking boss 10 extending from arm 9 parallel to the disc-shaped sealing member, with the surface 11 of boss 10 that faces main section 3 to form a camming surface. A forwardly extending flange 12 of the main section 3 of the coupler has a leading edge 13 which has a varying radius to form a ramp that forces the sealing members of mating couplers to move towards each other as the mating couplers are mutually rotated upon engagement between ramp surface 13 and camming surface 11. Further rotation of the mating couplers will cause constant radius surface 14 of the flange 12 to engage camming surface 11 of the locking boss to maintain the sealing members in a compressed state and permit passage of air through opening 7 without leakage.

Extending radially from the main section 3 is a stop 15 having a notch 15' while a second complementary stop 16 extends from the first arm 9 of the extension 8 to limit rotation of the couplers, and main section 3 further includes a curved surface 17 which faces a corresponding curved surface 18 of boss 10 during mating.

Figure 3:
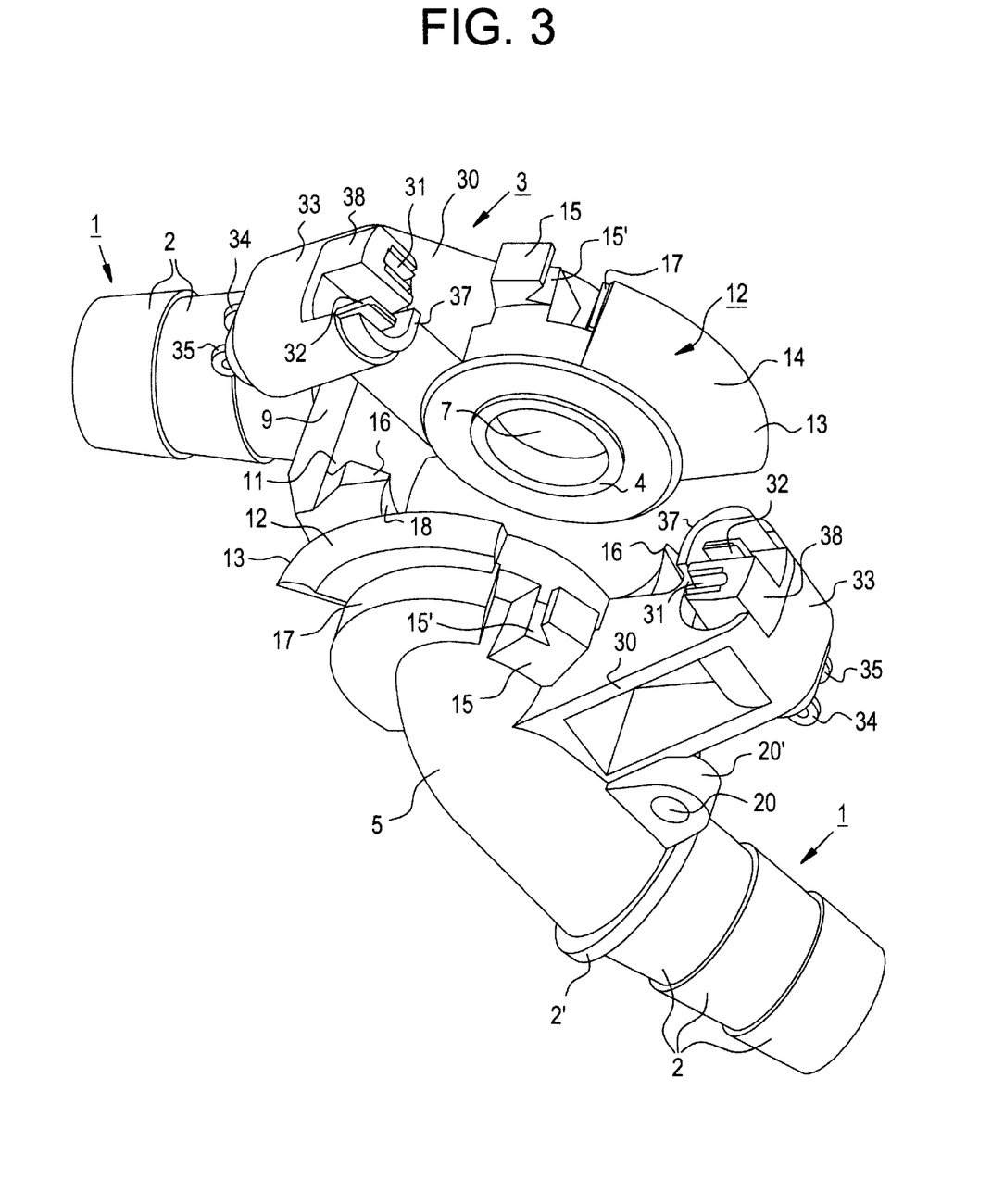
FIG. 3 is a perspective view of the preferred coupler in position to begin mating with a corresponding second coupler.
Figure 4A:
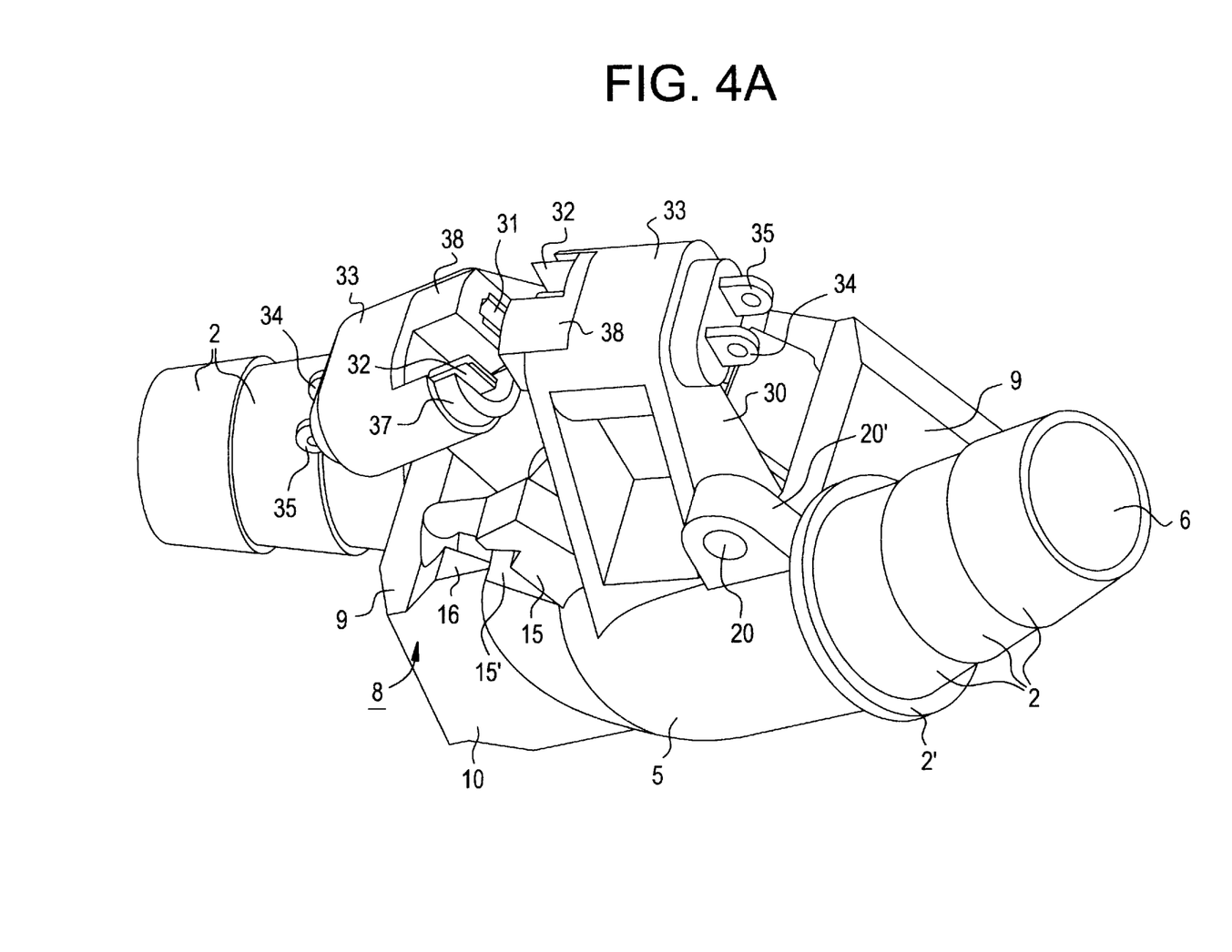
FIG. 4A is a perspective view of the preferred couplers during camming but before coupling of the connectors during mating (or after uncoupling of the connectors during separation).
Figure 4B:
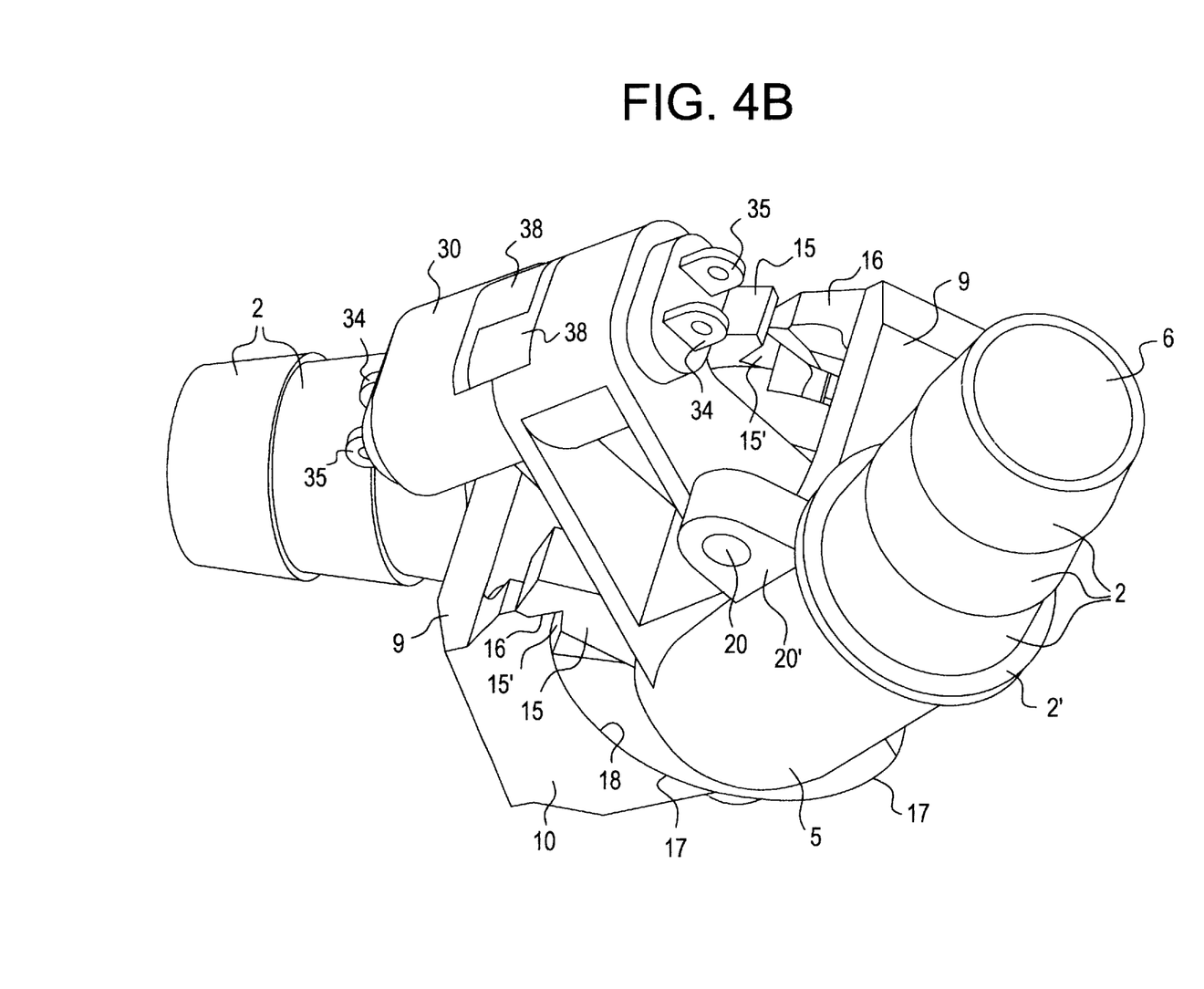
FIG. 4B is a perspective view of the preferred couplers in full mated relationship.

As shown in FIGS. 3, 4A, and 4B, the preferred coupler is mated with an identical coupler by first positioning the elastomeric pneumatic seals so that they face each other with the leading edge 13 of flange 12 facing the slot formed by forwardly facing surface 19 of and the camming surface 11 such that the ramp formed by leading edge 13 will engage the camming surface upon mutual rotation of mating couplers during coupling. Thus positioned, the couplers can be rotated, clockwise in the position shown in FIGS. 1 and 2A, so that the camming and ramp surfaces move the couplers towards each other to compress the elastomeric seals on each coupler and establish an airtight seal around the openings 7.

Mutual rotation of the couplers is then continued until the first and second stops 15 and 16 contact each other. Advantageously, the ramp surface 13 on flange 12 terminates at a position on the flange such that the corresponding seals have already substantially moved towards each other by the time the male and female contacts of the data bus connector (described below) initially engage each other during mating in order to reduce lateral movement of the male and female contacts during entry of the male contacts into the female contacts.

In addition to the above elements, the illustrated coupler includes a projection 20' having an opening 20 for shock cord attachment to the rail car, to prevent the coupling members from hanging to close to the railroad tracks and ground.

It will be appreciated by those skilled in the art that the above-described elements are all essentially conventional in railway glad-hand couplers, as is the above-described method of coupling, and that details of the illustrated elements may be varied as necessary for different types of pneumatic/electrical couplers so long as the general principles of hermaphrodicity and coupling by rotation are maintained The remaining elements of the preferred coupler, described below, and in particular the data bus connector portion of the preferred coupler, are not conventional.

According to the preferred embodiment of the invention, the data bus connector portion of the illustrated coupler is provided by a connector member 30 which extends from main section 3 and houses a pair of contacts, illustrated as a female fork contact 31 and male blade contact 32, although those skilled in the art will appreciate that a pair of hermaphroditic contacts could be substituted for contacts 31 and 32, as will be described in more detail below in connection with FIGS. 5A and 5B. The pair of contacts extends from the forward side of a housing 33 and preferably includes contact termination tails 34 and 35 extending from the rearward side of housing 33. Contact termination tails 34 and 35 may be secured to wires of a data bus (not shown) by any convenient method, and could for example be in the form of an eye, a solder cup, a screw lug, a crimp, or any similar termination feature.

The male contact is surrounded by a pocket 36 bordered by an elastomeric dielectric sealing member 37 made of an elastomeric dielectric material while female contact 31 is enclosed on all sides except the front mating end and the rear termination end by an elastomeric dielectric sealing projection 38 shaped to fit within pocket 36 when the male contact has been inserted into the female contact upon relative rotation of the mating coupling members. The combination of elastomeric dielectric members 37 and 38 thereby completely encloses the contacts upon mating from each other and from the outside of the coupler to provide data line isolation and shock protection for a person performing the coupling, while still providing sufficient flexibility to allow tolerances during mating.

Figure 5A:
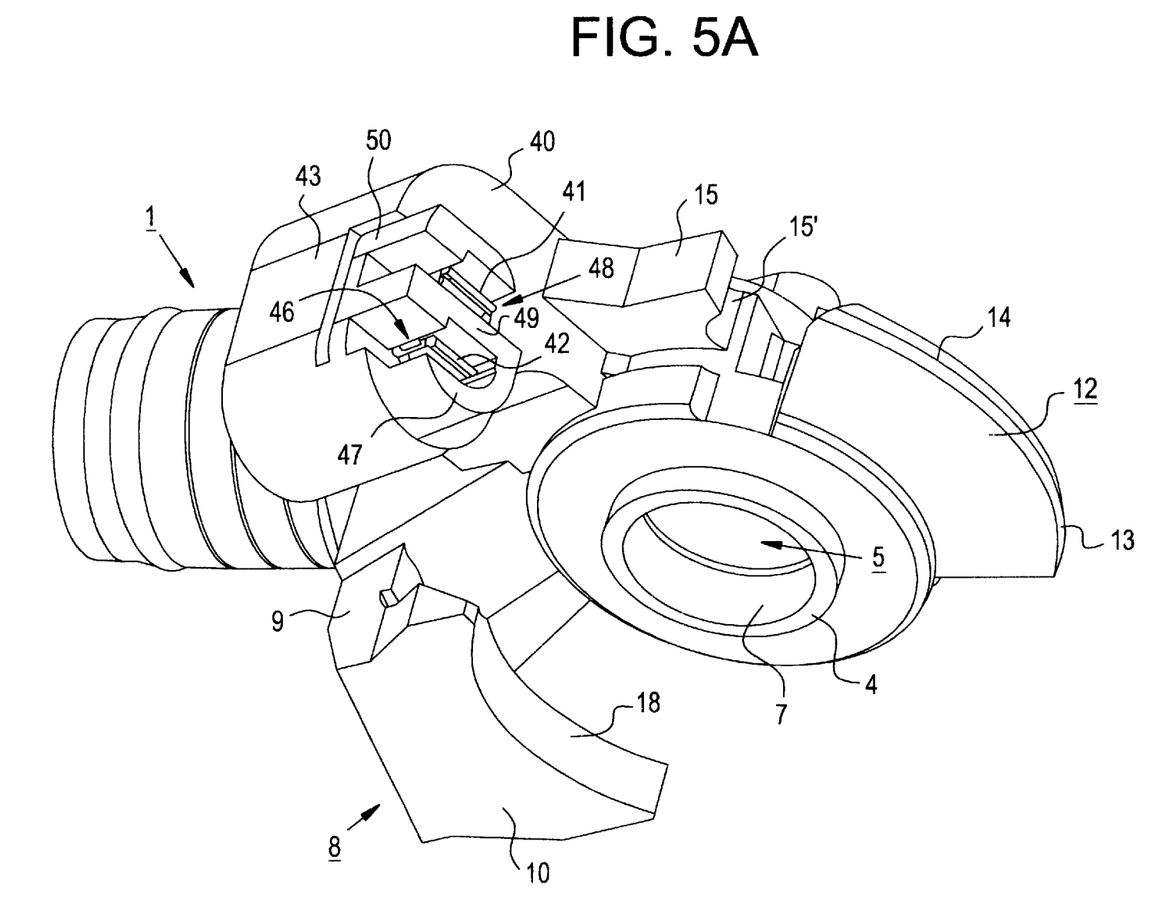
FIG. 5A a perspective view of a variation of the coupler shown in FIG. 1, in which the male and female contacts are replaced by a pair of hermaphroditic contacts.
Figure 5B:
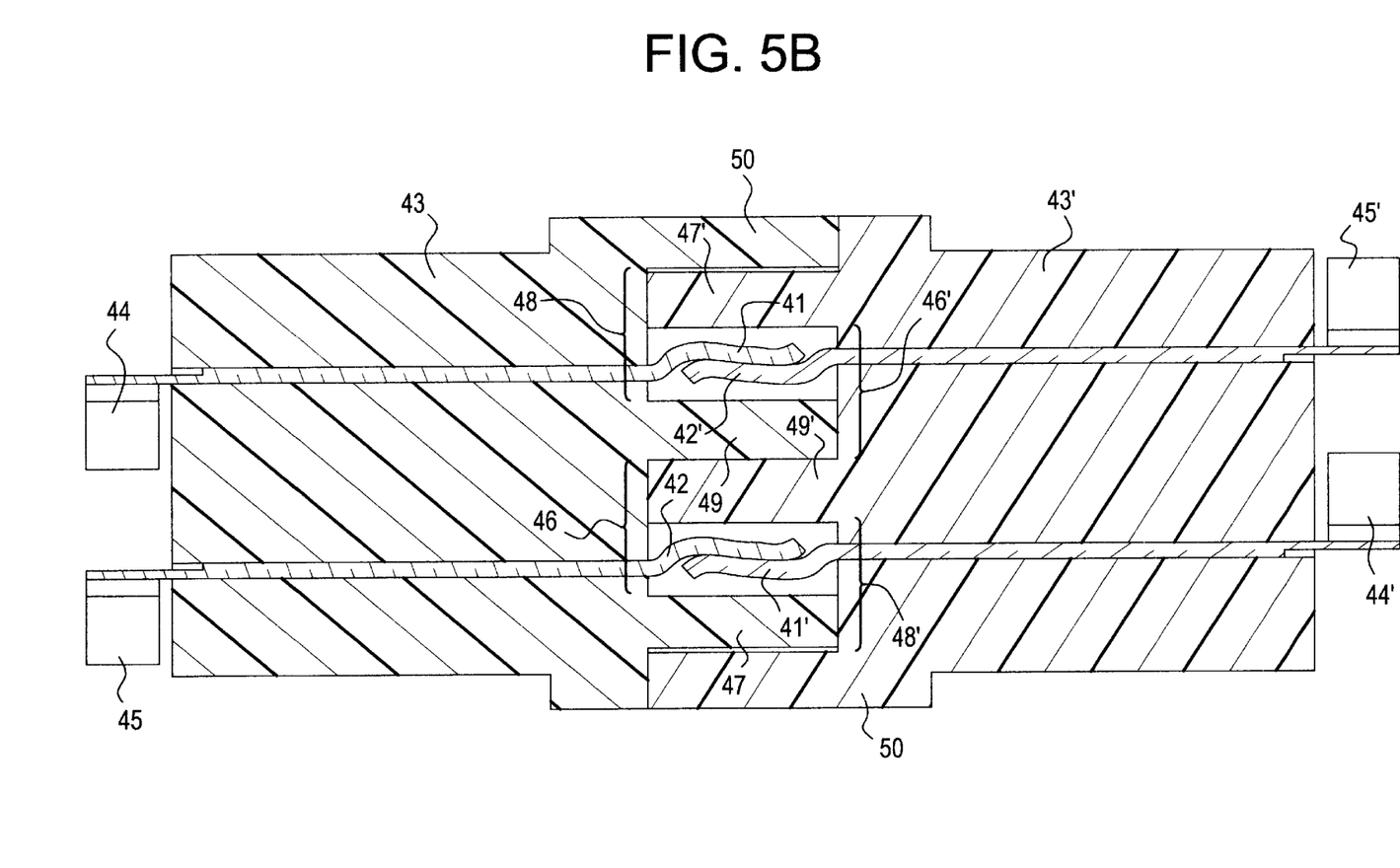
FIG. 5B is a cross-sectional view, taken from above, of the electrical connection feature of the coupler of FIG. 5A, showing the manner in which the hermaphroditic contacts are mated to identical contacts of a mating connector.

According to a variation of the preferred embodiment illustrated in FIGS. 5A and 5B, the data bus connector portion of the preferred coupler, which is otherwise standard and essentially identical to the coupler illustrated in FIGS. 1, 2A–2C, 3, 4A, and 4B, and therefore has been given the same reference numerals and will not be further described in detail, is provided by a connector member 40 which extends from main section 3 and houses a pair of hermaphroditic contacts 41 and 42. The pair of contacts extends from the forward side of a housing 43 and preferably includes contact termination tails 44 and 45 (shown in FIG. 5B) extending from the rearward side of housing 43. As with the above-described embodiment, contact termination tails 44 and 45 may be secured to wires of a data bus (not shown) by any convenient method, and could for example be in the form of an eye, a solder cup, a screw lug, a crimp, or any similar termination feature.

One of the hermaphroditic contacts 42 is surrounded by a pocket 46 bordered by an elastomeric dielectric sealing member 47 made of an elastomeric dielectric material and shaped to fit within a pocket 48' of the mating connector while the other hermaphroditic contact 41 is enclosed by a pocket 48 formed by a portion 49 of sealing member 47 and by an elastomeric dielectric sealing projection 50 shaped to fit within pocket 46' when hermaphroditic contacts 41 and 42 have been inserted into corresponding hermaphroditic contacts 42' and 41' of the mating connector upon relative rotation of the mating coupling members (the primed reference numbers represent corresponding portions of the mating connector which are identical to the non-primed portions shown in FIGS. 5A and 5B).

Figure 1:
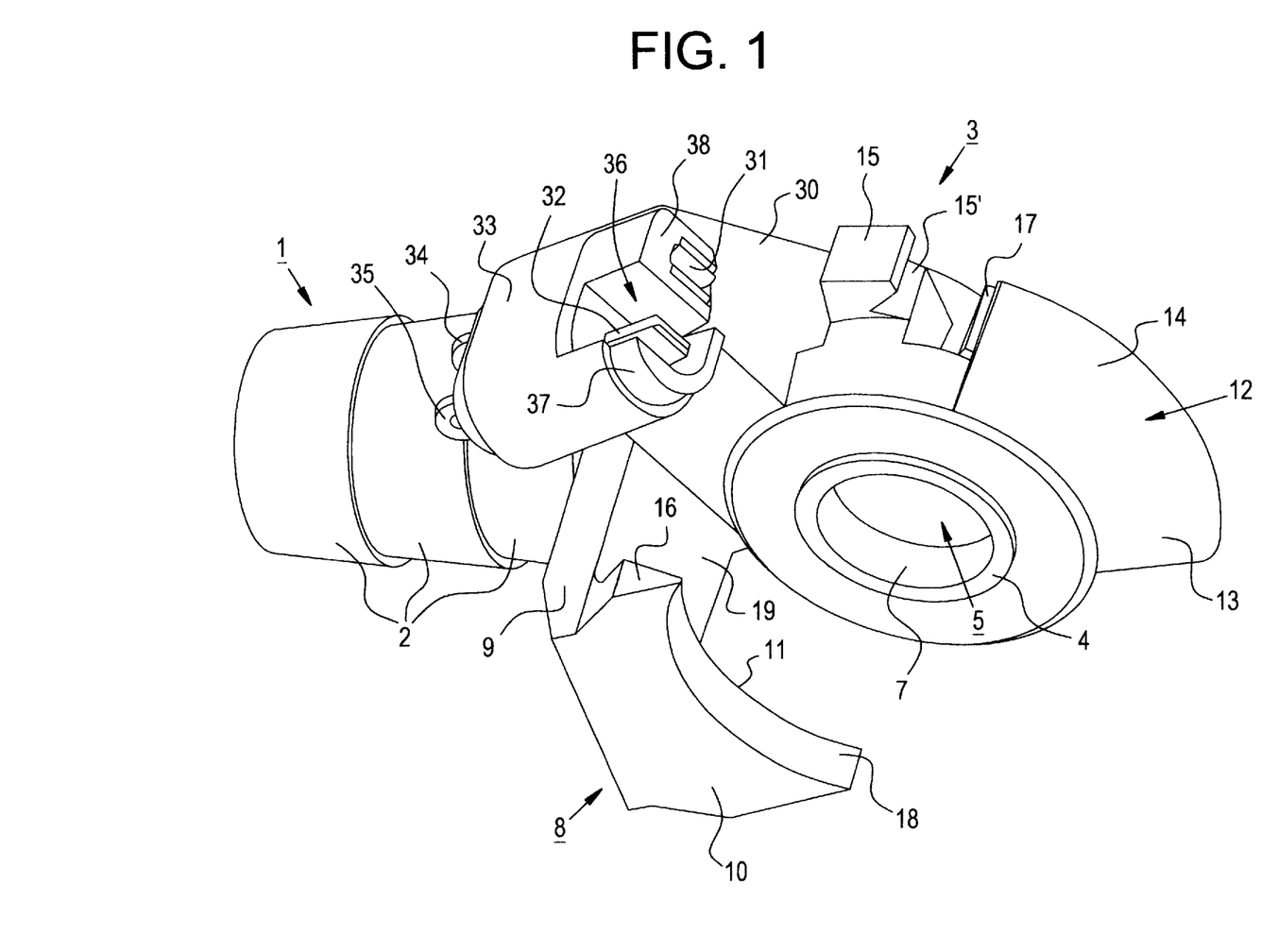
FIG. 1 is a perspective view of a pneumatic/electrical hermaphroditic glad-hand coupler constructed in accordance with the principles of a preferred embodiment of the invention.
Figure 2A:
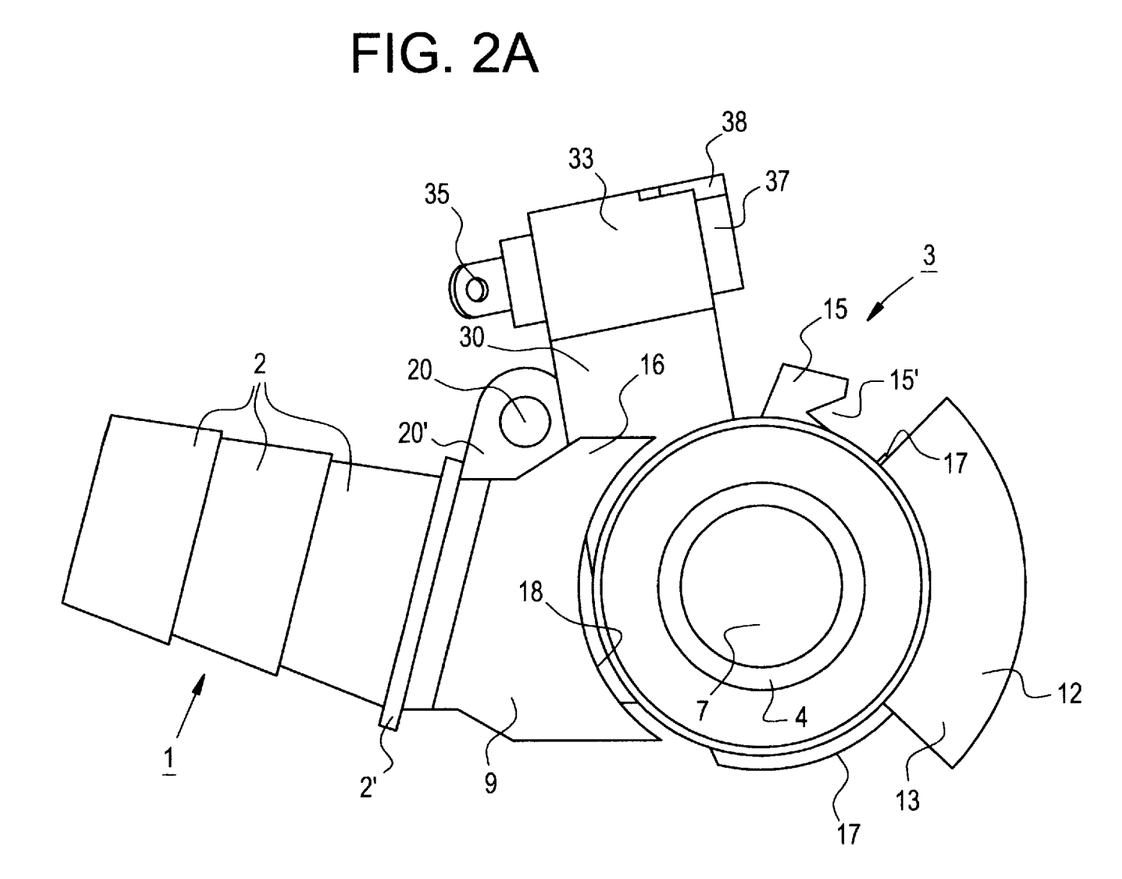
FIG. 2A, a side view of the preferred coupler, displaying the pneumatic coupling face and elastomeric pneumatic seal.
Figure 2B:
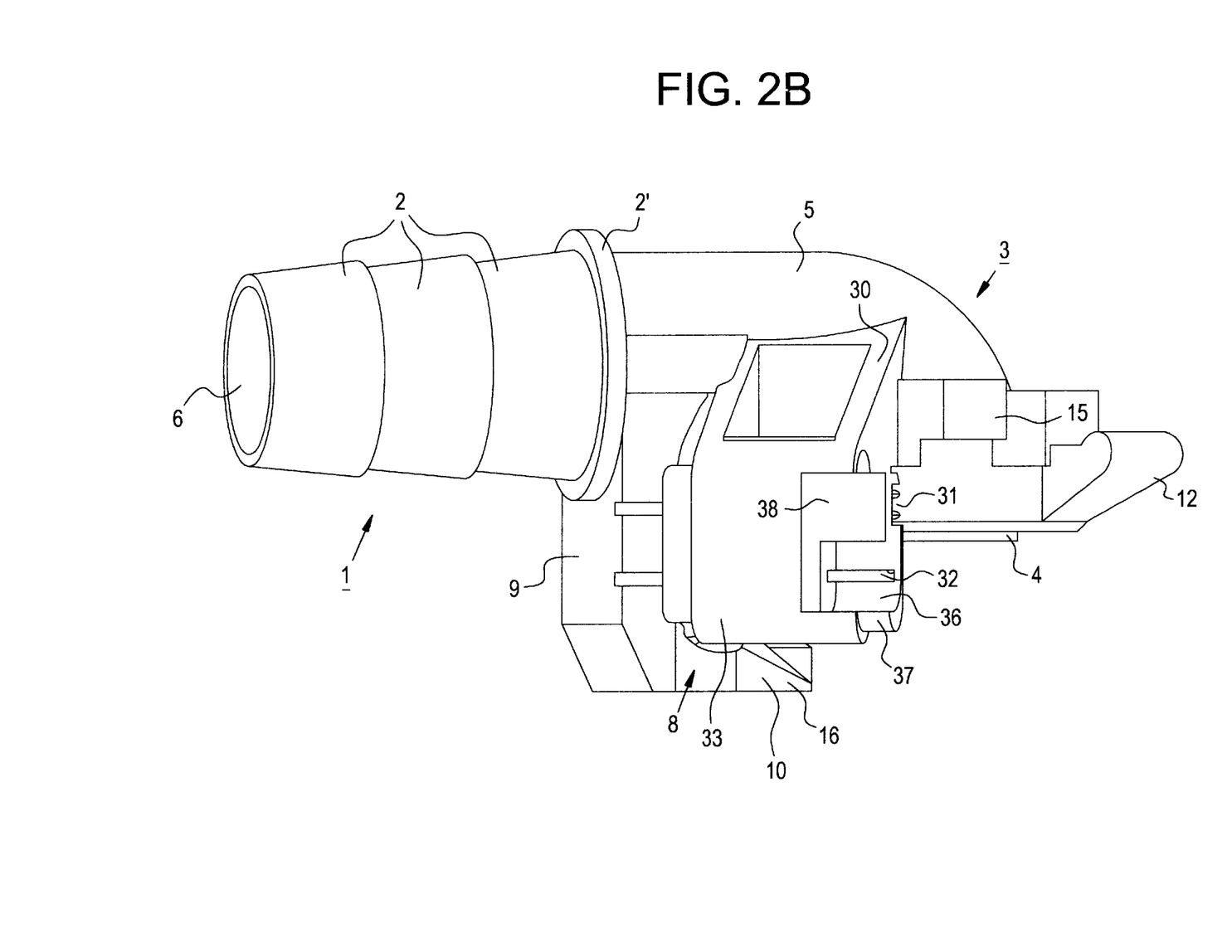
FIG. 2B, is a second side view of the preferred coupler, displaying the electrical connection feature.
Figure 2C:
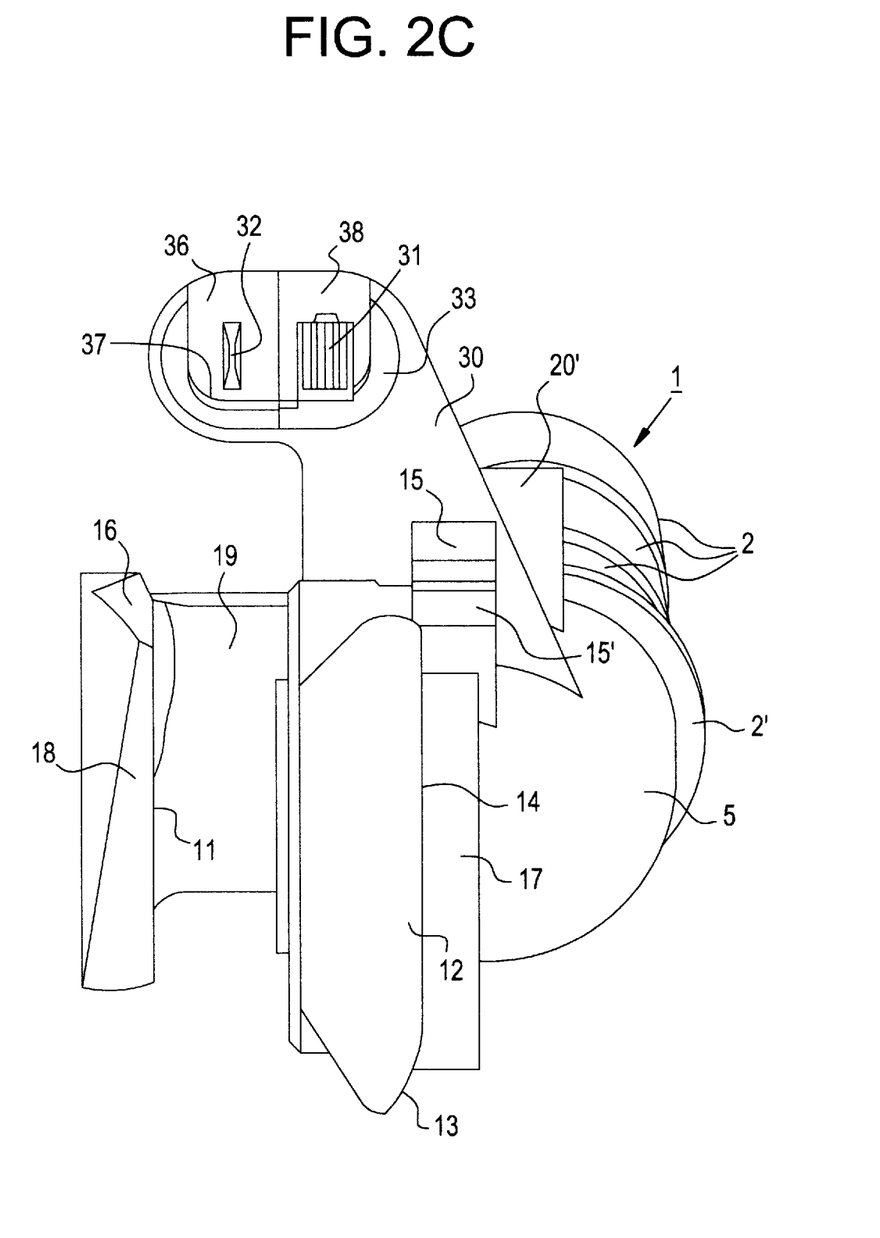
FIG. 2C is a front view of the preferred coupler.

The combination of elastomeric dielectric members 47 and 50, like those of the embodiment shown in FIG. 1, thereby completely encloses the hermaphroditic contacts from each other and from the outside of the coupler to provide data line isolation and shock protection for a person performing the coupling, while still providing sufficient flexibility to allow tolerances during mating.

Having thus described a preferred embodiment of the invention and a variation thereof, those skilled in the art will appreciate that further variations and modifications of the preferred embodiment, such as varying the shapes and arrangement of the various elements of the pneumatic coupling elements of the coupler (for use in couplers other than railway glad-hand couplers), the number and type of electrical contacts, and/or other aspects of the data bus connector portion of the coupler, may be made without departing from the scope of the invention.

It is accordingly intended that the invention not be limited by the above description or accompanying drawings, but that it be defined solely in accordance with the appended claims.

I claim:

1. A hermaphroditic pneumatic/electrical coupler, comprising:
   pneumatic coupling means for sealing a passage for pneumatic fluid between the coupler and a mating coupler; and
   data bus connecting means for establishing an electrical connection between data buses, wherein the data bus connecting means extends from a main section of the pneumatic coupling means and contains a pair of contacts each extending tangentially in a direction of travel of the coupler during rotation of the coupler as the coupler is being coupled with the mating coupler, said pair of contacts being arranged to mate with an identical pair of contacts when the coupler is coupled to the mating coupler, and wherein each of the contacts is at least partially surrounded by an elastomeric dielectric member which combines with elastomeric dielectric members of the mating coupler to enclose and isolate both contacts upon mating of the pair of contacts with a respective pair of contacts of the mating coupler.

2. A hermaphroditic pneumatic/electric coupler as claimed in claim 1, wherein the pneumatic coupling means comprises a main section including a passage for pneumatic fluid opening laterally through an opening in an elastomeric seal; and
   means for causing the seal to engage and be compressed against a corresponding seal of the mating coupler upon relative rotation of the coupler and mating coupler about an axis of the opening.

3. A hermaphroditic pneumatic/electric coupler as claimed in claim 1, wherein the coupler is a glad-hand coupler.

4. A hermaphroditic pneumatic/electric coupler as claimed in claim 1, wherein the pair of contacts includes a male contact and a female contact.

5. A hermaphroditic pneumatic/electric coupler as claimed in claim 4, wherein the male contact is surrounded by a pocket, the pocket being defined on at least one side by one of said elastomeric dielectric members, and wherein the female contact is surrounded by another of said elastomeric dielectric members which is shaped to fit within an identical pocket of the mating coupler to enclose and isolate both contacts upon mating of the male and female contact with respective female and male contacts of the mating coupler.

6. A hermaphroditic pneumatic/electric coupler as claimed in claim 4, wherein the pneumatic coupling means comprises a main section including a passage for pneumatic fluid opening laterally through an opening in an elastomeric seal; and
   means for causing the seal to engage and be compressed against a corresponding seal of the mating coupler upon relative rotation of the coupler and mating coupler about an axis of the opening.

7. A hermaphroditic pneumatic/electric coupler as claimed in claim 6, wherein said means for causing the seal to engage and be compressed against a corresponding seal of the mating coupler comprises a ramp surface on a flange extending forwardly of the main section and a cam surface on an arm of an L-shaped member extending laterally of the main section, and wherein said ramp surface terminates at a position on the flange such that the corresponding seals have already substantially moved towards each other by the time respective said male and female contacts initially engage each other during mating in order to reduce lateral movement of the contacts during entry of the male contacts into the female contacts.

8. A hermaphroditic pneumatic/electric coupler as claimed in claim 4, wherein the coupler is a glad-hand coupler.

9. A hermaphroditic pneumatic/electric coupler as claimed in claim 8, wherein the coupler is arranged to mate both with an identical coupler and with a glad-hand coupler lacking a data bus connecting means.

10. A hermaphroditic pneumatic/electric coupler as claimed in claim 1, wherein the pair of contacts are a pair of hermaphroditic contacts.

11. A hermaphroditic pneumatic/electric coupler as claimed in claim 10, wherein each of the hermaphroditic contacts is surrounded by a pocket, the pockets being defined on at least one side by one of said elastomeric dielectric members, said elastomeric dielectric members being shaped to fit within identical pockets of the mating coupler to enclose and isolate both contacts upon mating of the hermaphroditic contacts with respective hermaphroditic contacts of the mating coupler.

12. A hermaphroditic pneumatic/electric coupler as claimed in claim 10, wherein the pneumatic coupling means comprises a main section including a passage for pneumatic fluid opening laterally through an opening in an elastomeric seal; and
   means for causing the seal to engage and be compressed against a corresponding seal of the mating coupler upon relative rotation of the coupler and mating coupler about an axis of the opening.

13. A hermaphroditic pneumatic/electric coupler as claimed in claim 12, wherein said means for causing the seal to engage and be compressed against a corresponding seal of the mating coupler comprises a ramp surface on a flange extending forwardly of the main section and a cam surface on an arm of an L-shaped member extending laterally of the main section, and wherein said ramp surface terminates at a position on the flange such that the corresponding seals have already substantially moved towards each other by the time respective said hermaphroditic contacts initially engage each other during mating in order to reduce lateral movement of the contacts during entry of the engagement of the hermaphroditic contacts with each other.

14. A hermaphroditic pneumatic/electric coupler as claimed in claim 10, wherein the coupler is a glad-hand coupler.

15. A hermaphroditic pneumatic/electric coupler as claimed in claim 14, wherein the coupler is arranged to mate both with an identical coupler and with a glad-hand coupler lacking a data bus connecting means.

* * * * *